Patented Oct. 8, 1946

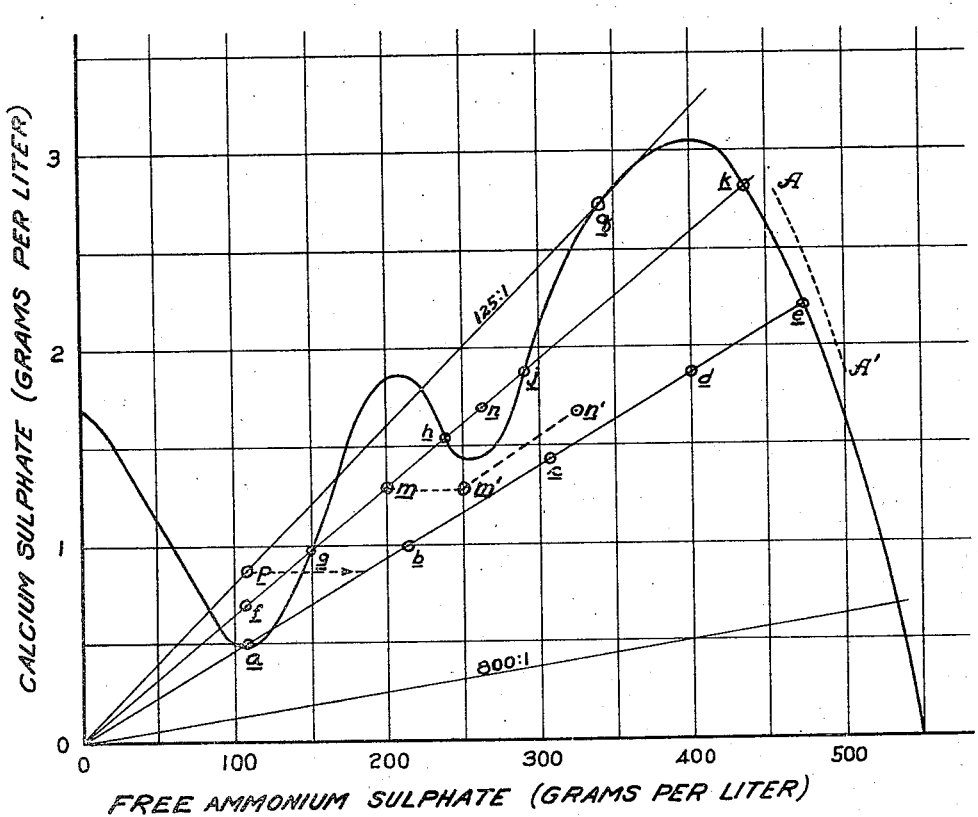

2,408,934

UNITED STATES PATENT OFFICE 2,408,934

PROCESS FOR RECOVERING BERYLLIUM SULFATE

Bengt R. F. Kjellgren, University Heights, Ohio, assignor to The Brush Beryllium Company, Cleveland, Ohio, a corporation of Ohio Application April 2, 1942, Serial No. 437,337
In Canada July 3, 1941

1 Claim. (Cl. 23—296)

This invention relates to a process for the production of beryllium sulfate and has for its object the production of beryllium sulfate substantially free of contamination with calcium, this application being a continuation in part of my earlier application Serial No. 350,981, filed August 3, 1940.

In the production of beryllium sulfate by methods employed prior to the present invention it has been found difficult in commercial operation to produce beryllium sulfate free or nearly free from contamination with calcium. For certain uses of beryllium sulfate substantial freedom from such contamination is required and an important need arose for a practical method capable of uniformly producing beryllium sulfate that is substantially calcium-free. For example, an important use of beryllium sulfate has been involved in the production of beryllium oxide, the latter being produced by first preparing beryllium sulfate and then converting the sulfate to the oxide. Since calcium, in the form of calcium oxide, is a harmful and troublesome contaminant of beryllium oxide in the case of various uses of the latter, it became desirable to produce the calcium-free sulfate in order to secure the uncontaminated oxide.

The above noted difficulty in the production of calcium-free beryllium sulfate was encountered in the use of the method of preparing the sulfate disclosed in the United States patent to Sawyer and Kjellgren, No. 2,018,473. The erratic character of the results secured, with respect to calcium contamination, were puzzling and unexplainable by any known properties or behavior of the substances involved. As a result of extensive studies and experimental investigations carried out under my direction it was discovered that calcium sulfate, as to solubility, presents a peculiar and, previous to the present invention, unpredictable behavior in solution with beryllium and ammonium sulfates. It was further discovered that the solubility of calcium sulfate in a saturated solution of beryllium sulfate is critically affected by the presence in the solution of ammonium sulfate if the concentration of the latter salt lies within certain limits hereinafter pointed out.

The present invention is based upon the above stated discoveries and by means of it the concurrent crystallization of calcium sulfate with beryllium sulfate can be prevented entirely or the crystallization of the calcium sulfate can be delayed in relation to the crystallization of the beryllium sulfate, to the end in either case that beryllium sulfate can be crystallized and removed from contact with the contaminated mother liquor prior to any appreciable crystallization of calcium sulfate and resultant contamination of the beryllium sulfate.

The behavior of calcium sulfate in a solution containing beryllium and ammonium sulfates, as determined by the experimental investigations referred to above, is indicated by the accompanying drawing which shows graphically the influence of free ammonium sulfate on the equilibrium solubility of calcium sulfate ($CaSO_4$) at room temperature, or about 20° C., in a solution which contains approximately 635 grams of beryllium sulfate ($BeSO_4.4H_2O$) per liter and which therefore is approximately saturated with the latter salt. The expression "free ammonium sulfate" as used in the last preceding sentence and elsewhere in this application, means ammonium sulfate present in a solution of beryllium sulfate in addition to the stoichiometric amount of ammonium sulfate needed to convert to ammonium alum any aluminum sulfate that may have been introduced or included in the solution in its preparation, as, for example, in the preparation from raw material such as beryl ore containing a substantial amount of aluminum. The relationships shown in the drawing have been determined experimentally by leaching an excess of freshly precipitated calcium sulfate with saturated beryllium sulfate solutions containing different amounts of ammonium sulfate until equilibrium conditions have been attained at approximately 20° C.

It will be observed from the graph that as the free ammonium sulfate concentration of the solution is gradually increased, the solubility of calcium sulfate decreases at first from an initial value of about 1.7 grams per liter when the solution is free of ammonium sulfate to a minimum value of about .5 gram per liter at an ammonium sulfate concentration of approximately 110 grams per liter. As the free ammonium sulfate concentration is increased beyond this latter value, the solubility of calcium sulfate increases abruptly and reaches a sub-maximum of about 1.8 grams per liter at an ammonium sulfate concentration of approximately 210 grams per liter. Further increase in the ammonium sulfate concentration results first in a slight reduction of the calcium sulfate solubility, but still further increases again raise the said solubility, a maximum solubility of about 3.1 grams of calcium sulfate per liter occurring in the presence of approximately 400 grams per liter of free ammonium sulfate. As the ammonium sulfate concentration is increased further, the solubility of calcium sulfate decreases and reaches zero at an ammonium sulfate concentration of about 500 grams per liter. It will be understood that the area under the curve represents a field of relationships in which calcium sulfate remains soluble. In the field above and to the extreme right of the curve, calcium sulfate is insoluble under equilibrium conditions.

By reason of my discovery of the indicated influence of free ammonium sulfate concentration upon the solubility of calcium sulfate in a saturated beryllium sulfate solution, and by reason of my further discovery that the free ammonium sulfate concentration imparts a supersaturating effect which will be described more fully hereinafter, it becomes possible to retain the calcium salts in solution while beryllium sulfate is being crystallized from the solution. In brief, the objectives of the invention are accomplished by adjusting the ammonium sulfate concentration of the solution to a value, determinable from the curve of the drawing, that is effective in holding the calcium sulfate content in at least supersaturated solution until after the beryllium sulfate has been crystallized and the crystals have been separated from contact with the resulting calcium-contaminated mother liquor.

For the purpose of detailed description and full explanation of the invention it will be convenient to consider its application to the method of producing beryllium sulfate disclosed in the Sawyer and Kjellgren Patent No. 2,018,473 to which reference has already been made. In that patented method a suitable raw material, such as beryl ore, is treated to render it soluble in sulfuric acid, and then is further treated with such acid to convert some components thereof to sulfates. The sulfated ore is then leached with water to extract the soluble sulfates. The solution so obtained, after filtering, may contain sulfates of various elements that were present in the ore, the principal ones of which are the sulfates of beryllium and aluminum. Such a solution can be treated in either of two ways disclosed in the patent to effect a selective separation of beryllium sulfate from aluminum sulfate. These two alternative procedures will now be described, in turn, as modified by the addition of the present invention.

In applying the invention to the first procedure, the filtered leaching solution obtained from the sulfated beryl ore and containing both aluminum and beryllium sulfates is at first adjusted to a sub-saturated concentration of beryllium sulfate such as to produce a mother liquor saturated in beryllium sulfate after the ammonium alum is crystallized, and then an amount of ammonium sulfate is added sufficient to convert all of the aluminum sulfate to alum and, in addition, to establish in the mother liquor remaining after the alum is crystallized, a concentration of free ammonium sulfate of preferably about 90 to 125 grams per liter. The solutions may then be treated in any manner capable of causing the crystallization of beryllium sulfate. The calculations required to produce the stated concentration in the saturated beryllium sulfate mother liquor obtained after the alum has been crystallized are made quite simple by expressing the free ammonium sulfate concentration as a percentage of the beryllium sulfate concentration. To illustrate, the saturated mother liquor, as previously stated, contains 635 grams of beryllium sulfate ($BeSO_4 \cdot 4H_2O$) per liter, and it is desired that the free ammonium sulfate concentration therein be between 90 and 125 grams per liter. Accordingly, the free ammonium sulfate concentration is to be 90/635ths to 125/635ths of the beryllium sulfate concentration, or 14.1% to 19.7% of the latter, in the saturated mother liquor. It will be recognized that the same percentage relationship must also exist in the sub-saturated solution prior to the crystallization of the alum. Hence, to determine how much free ammonium sulfate should be added prior to crystallization, all that is necessary is to determine the beryllium sulfate concentration in the sub-saturated solution, and then add from 14.1% to 19.7% thereof as free ammonium sulfate. As will be noted from the curve in the drawing, the latter concentrations of free ammonium sulfate are sufficient to reduce the solubility of calcium sulfate to about a minimum value. Since the leaching solution from the sulfated beryl ore generally contains no free ammonium sulfate, one may determine from the curve that it is capable of dissolving as much as about 1.7 grams of calcium sulfate per liter if the solution is saturated in beryllium sulfate. After the ammonium sulfate has been added, however, and the solubility of calcium sulfate has been reduced to a minimum, the calcium sulfate in excess of the minimum solubility will tend to crystallize from the solution along with the alum crystals. The excess so crystallized would correspond to about 1.2 grams per liter. After a sufficient period of time has elapsed to permit these crystallizations to be completed, the solution may be filtered to remove the alum crystals and the precipitate of calcium sulfate. If such filtration is performed carefully so that all of the rather fine precipitate of calcium sulfate is retained on the filter, the resulting filtrate will have had its calcium sulfate content reduced to about one-half gram per liter and will also be substantially free of aluminum ions. The filtrate is thereupon in condition for further treatment to crystallize beryllium sulfate selectively therefrom. Such crystallization may be performed by evaporating the aluminum-free filtrate under vacuum. I prefer, however, to perform it by first evaporating the filtrate by means of heat, thereby concentrating it to the point where the filtrate is substantially saturated in beryllium sulfate at or near the boiling point of the solution. Evaporation to about half its original volume is adequate, but the evaporation may be either greater or less. After such concentration has been effected, the solution is transferred from the evaporator to a crystallizing tank where the temperature of the solution may be reduced at a suitably controlled rate. Since the solubility of beryllium sulfate decreases with temperature, cooling of the solution causes beryllium sulfate to crystallize from the solution. After the solution has been cooled to about room temperature, the crystals of beryllium sulfate may be removed from contact with the mother liquor by filtering or centrifuging, or otherwise. Now if, for purposes of illustration, we assume that the aluminum-free filtrate is concentrated by evaporation to the point where the concentration of beryllium sulfate in the concentrated solution is about two times the concentration of beryllium sulfate in the aluminum-free filtrate, it will be apparent that the ammonium sulfate concentration and the calcium sulfate concentration in the concentrated solution will have been increased in the same proportion; that is, the ammonium sulfate concentration will have been increased from, say, 110 grams per liter to 220 grams per liter. Likewise, the calcium sulfate concentration will have been increased from about 0.5 gram per liter to about 1.0 gram per liter. Now, as the solution is cooled, and as beryllium sulfate crystallizes from it, the volume of the remaining mother liquor is gradually decreased so that the concentrations of ammonium sulfate and calcium sulfate are correspondingly gradually increased. When the crystallization has been completed, with resultant removal from the solution of the corresponding water of crystallization, the over-all concentration ratio may have been increased from 2.0 (as it was after the evaporation step) to 2.8 after the crystallization step. In other words, the crystallization of beryllium sulfate together with the slight effect of cooling has increased the ammonium sulfate concentration from 220 to 308 grams per liter, and of the calcium sulfate from 1.0 to 1.4 grams per liter. Referring now to the drawing it will be seen that these changes in concentration can be plotted thereon so that the changes which have taken place may be followed graphically. Thus point $a$ represents the ammonium sulfate and calcium sulfate concentrations in the cold, aluminum-free solution just prior to evaporation. Point $b$ represents the concentrations of these same sulfates in the hot solution after evaporation, and point $c$ represents the concentrations in the cold mother liquor after the crystallization of beryllium sulfate has been completed. By joining these points with a line, it can be seen that the line represents the locus of all concentrations through which the solution has passed while being treated in accordance with the procedure here under discussion. Since the line joining the points lies wholly within the solubility curve for calcium sulfate, it is apparent that at no time during the entire treatment has a condition prevailed which would allow calcium sulfate to crystallize from the solution. The result is that all the calcium sulfate has been held in solution during the treatment, and the crystals of beryllium sulfate which have been recovered by selective crystallization are uncontaminated with calcium sulfate.

It will be understood from the preceding example that so far as the principles of the invention are concerned, there was no need to limit the evaporation step to a concentration ratio of 2.0, since clearly the solution could have been evaporated more than this amount without having approached the limit of solubility of calcium sulfate therein. Thus it might have been evaporated so as to attain the concentrations represented by point $c$. The subsequent crystallization would have increased the concentrations along the line $abc$ to some point such as $d$, for example. So long as point $d$ falls within the curve, no crystallization of calcium sulfate would occur. In brief, therefore, it will be seen that the limiting value of concentration is found by projecting line $abc$ so as to intersect the curve at point $e$. So long as the concentrations of ammonium sulfate and calcium sulfate do not exceed the concentrations which are represented by point $e$, the calcium sulfate will remain dissolved in the mother liquor at room temperature. Ordinarily, such high concentrations cannot be used practically, however, because the crystal slurry becomes too thick to be handled conveniently in ordinary equipment. Where such practical limitations do not arise, however, the principles of the invention may be relied on to accomplish the desired result of holding the calcium sulfate in solution.

It will be recognized from the preceding example that an important feature of the preferred procedure is the step of establishing an ammonium sulfate concentration in the aluminum-free solution of about 110 grams per liter. On the basis previously explained, this concentration represents about 17.3% of the beryllium sulfate concentration. The establishment of this ammonium sulfate concentration not only effects a reduction of the calcium sulfate concentration to about one-half gram per liter, but also determines the graphical path along which the subsequent process steps conduct the solution. Thus it will be seen that the location of the point $a$, which is determined by the amount of ammonium sulfate present in the solution, in turn determines the direction of the line $abc$ with respect to the origin of the curve. Since all locus lines representing the path of solutions radiate about the origin, it is apparent that if the point $a$ were carelessly selected, the line $abc$ might pass outside the solubility curve. Under such conditions, the benefits of the invention might be wholly lost. This possibility is discussed more fully hereinafter. It is advisable, therefore, to proportion the ammonium sulfate to the calcium sulfate content so that the latter salt will remain dissolved during all of the evaporation step and the subsequent crystallization step. It will be noted that the line $abc$ represents a ratio between free ammonium sulfate and calcium sulfate of about 220 to 1. Such a ratio prevails if, by filtering the solution carefully, the calcium sulfate content in the filtrate has been reduced to ½ gram per liter. Those skilled in the art will recognize, however, that sometimes it may not be feasible to perform the filtration carefully enough in commercial practice to remove all of the precipitate. Then a problem arises in determining whether or not the invention can be utilized for its intended purposes. For example, let us assume that the filtration is not performed carefully, and that part of the precipitate of calcium sulfate passes through the filter into the filtrate. The concentration in the filtrate may then be, say .7 gram per liter instead of .5 gram per liter. The concentrations of the solution may then be designated graphically by the point $f$, and it will be observed that if a straight line is drawn through the origin of the curve so as to pass through point $f$, it will, when extended, pass into a field of concentrations wherein calcium sulfate is insoluble under equilibrium conditions. Such field lies between points $h$ and $j$. Between other points on the line, such as between $g$ and $h$, and between $j$ and $k$, the calcium sulfate is soluble. Consider, now, that the solution is treated in accordance with the first procedure as identified above. Under such treatment, the concentrations would move from the point $f$ to, say, the point $m$ during evaporation. Interpreting the effects of such movement, it will be recognized that during the initial stages of the evaporation treatment, the solution will contain undissolved crystals of calcium sulfate, but that after the concentrations have been increased to the values designated by the point $g$, these crystals will dissolve. Accordingly, when the concentrations designated by point $m$ have been reached, all the calcium sulfate will be in solution and the solution should be in readiness for the step of crystallizing beryllium sulfate therefrom by cooling it. It will be appreciated from what has been said previously, however, that as the crystallization proceeds, the concentrations of ammonium sulfate and calcium sulfate are increased. Let us assume that these concentrations will reach the values designated by the point $n$ when the crystallization has been completed. By reference to the curve, it will be seen that the point $n$ lies in a field where the calcium sulfate would be insoluble if equilibrium conditions prevailed. I have found, however, that under conditions such as are exemplified here, the calcium sulfate may not be precipitated as one would expect by interpreting the curve. The explanation for this anomaly appears to be that such precipitation is prevented, at least temporarily, by reason of the fact that the solution undergoes a condition of supersaturation. In other words, the solution does not attain equilibrium conditions immediately upon passing out of the region $gh$ into the region $hj$. On the contrary, it becomes supersaturated with respect to calcium sulfate, and is sufficiently stable to remain supersaturated for a rather extended period of time. Of course, if the degree of supersaturation is carried to an extreme, then the solution becomes unstable and breaks down to precipitate calcium sulfate and ultimately to reach equilibrium conditions. I have found, however, that the unstable condition of supersaturation may continue for many hours, and that as a result, the crystallization of beryllium sulfate may be carried out in such a solution without becoming contaminated with calcium sulfate. It will be appreciated, however, that the crystals should be removed from contact with the supersaturated solution before it breaks down. Since the supersaturation may continue for as long as seven or eight hours, it is possible to effect such removal before the breakdown occurs. The following example will illustrate this feature.

For the purpose of illustrating the supersaturating effect which is introduced by the presence of ammonium sulfate, a quantity of aluminum-free solution containing about .7 gram of calcium sulfate per liter and about 110 grams of ammonium sulfate per liter was concentrated by evaporation to about double the above concentrations, as measured in the hot concentrated solution. The hot solution was, at this time, substantially saturated in beryllium sulfate. It was next cooled at a relatively slow rate designed to permit crystallization of beryllium sulfate to continue for a period of about eight hours before room temperature would be reached. Samples were taken at twenty-minute intervals during this period of time, and the samples so taken were analyzed for calcium. Samples of beryllium sulfate crystals taken during the first seven hours of the crystallization were found, upon analysis, to contain between .0005% and .002% calcium sulfate. The sample taken at 7 hours and 20 minutes contained .05% calcium sulfate, and subsequent samples taken at 7 hours and 40 minutes, eight hours, etc., contained as much as .07%. In view of these results, it will be apparent that the solution broke down rather rapidly and permitted the calcium sulfate to crystallize from the solution.

In view of the supersaturation effect which is encountered under the conditions just discussed, it becomes apparent that the insoluble field $hj$ does not necessarily prevent one from using ammonium sulfate-calcium sulfate ratios which penetrate that field. In fact, I have found in practicing the invention that ratios as low as 125 to 1, as designated by line $pq$, may be employed satisfactorily. It should be recognized, however, that with such small ratios, the degree of supersaturation is apt to be more extreme than in the case of larger ratios so that the solution is more apt to become unstable sooner. If one recognizes this fact, however, he can usually shorten the crystallization period sufficiently to enable him to separate the crystals of beryllium sulfate before the solution breaks down. Where this cannot be done conveniently, then these small ratios should be avoided. A ratio of 150 will usually afford ample time for commercial working of the invention, and, of course, if a ratio of 175 to 1 or more is used, the supersaturation effect need not be relied on.

In view of the fact that a ratio as low as 125 to 1 is thoroughly operative for accomplishing the purposes of the invention, it will be apparent that a calcium sulfate concentration of about 0.9 gram per liter can be tolerated in the filtrate if an ammonium sulfate concentration of about 110 grams per liter also prevails in the filtrate. Accordingly, it is permissible to allow the filtration at point $a$ to be done in filtering apparatus which does not retain all of the precipitate of calcium sulfate. Nevertheless, it will be apparent that it is advantageous to filter out as much as possible of the precipitate since if the calcium sulfate concentration in the filtrate is held to its minimum value of ½ gram per liter, a high ratio of ammonium sulfate to calcium sulfate can be obtained with a minimum content of ammonium sulfate.

It should be recognized that even though the filtration mentioned above does not separate out all of the precipitate of calcium sulfate, it is possible yet to avoid the uncertainties of operation which accompany a reliance upon the supersaturation effect. For example, if after filtration the calcium sulfate concentration in the aluminum-free filtrate is at, say, 0.9 gram per liter, it is not necessary that the solution be treated so as to move along line $pq$ during the evaporation and crystallization steps. Instead, further additions of ammonium sulfate may be made to the filtrate before evaporation is started, the addition being of such amount as to increase the ammonium sulfate-calcium sulfate ratio to any desired value. For example, by adding enough ammonium sulfate to the filtrate to raise the ratio to 220 to 1, the evaporation and crystallization steps will proceed along line $abc$ instead of along line $pq$. Likewise, the addition may be such as to establish any other desired ratio which will not extend into a field where supersaturation may be encountered. In general, however, ammonium sulfate concentrations in the filtrate of greater than about 350 grams per liter should be avoided since such high concentrations are apt to lead to the practical difficulties mentioned above in connection with the handling of thick crystal slurries, particularly after the filtrate has been evaporated and crystallized. Consequently, where the calcium content in the filtrate is as much as 0.9 gram per liter, ratios of over about 350 to 1 should be avoided. Where the calcium content is around one-half gram per liter, the ratio in the filtrate may be as high as 700 to 1. It will be understood that in all events, the filtrate should be checked for ammonium sulfate and calcium sulfate concentrations before evaporation is started, to determine that a ratio of at least 125 to 1 exists. For this condition at least about 80 grams of ammonium sulfate per liter must be present when the solution is saturated in calcium sulfate, as will appear from the lowest intersection of the line $pq$ with the solubility curve. Additions of ammonium sulfate should be made in case the ratio is found to be less, and as pointed out, the additions can be of such quantities as will establish any desired ratio greater than 125 to 1, so long as the ammonium sulfate concentration is maintained less than about 350 grams per liter.

In applying the invention to the second procedure of the Sawyer and Kjellgren Patent No. 2,018,473 referred to above, let us assume that the leaching solution containing aluminum sulfate, beryllium sulfate and calcium sulfate is treated in accordance with the second procedure described in the patent. As there described, ammonium sulfate would be added to the leaching solution to convert the aluminum sulfate to alum and to provide a suitable excess required to render the alum insoluble. This excess, or free ammonium sulfate concentration might be, say, 60 grams per liter. If the leaching solution were saturated in calcium sulfate before the addition of the ammonium sulfate, the addition would depress the solubility and cause some calcium sulfate to crystallize out of the solution. According to the curve, the calcium sulfate so crystallized would correspond to a decrease of about 0.7 gram of calcium sulfate per liter, and this amount would appear in the mixed crystals of alum and beryllium sulfate. Now the problem is to recover calcium-free beryllium sulfate from this contaminated mixture of crystals. The present invention may be used to solve this problem by leaching the mixed crystals with cold water containing sufficient ammonium sulfate to produce at the conclusion of the leaching step, a saturated solution of berylium sulfate containing preferably about 110 grams of ammonium sulfate per liter. By this procedure, the ammonium alum will not be dissolved and the amount of calcium sulfate in the saturated beryllium sulfate would be at the minimum of 0.5 gram of calcium sulfate per liter. It will be understood that after separation of the alum crystals and careful filtration of the mother liquor, the filtrate would correspond to a solution identified by the point $a$. It consequently may be evaporated and beryllium sulfate crystallized from it in the same manner as the solution described previously in connection with line $abc$.

In connection with the discussion of the supersaturation effect, a previous description followed a solution along the line $fghj$, and it was pointed out then that by the time the crystallization of beryllium sulfate had been completed, the ammonium sulfate and calcium sulfate concentrations had arrived at the point $n$. Since the latter point falls in an insoluble field, reference was made to the influence of the supersaturation effect. Now it will be apparent to those skilled in the art that it is unnecessary to proceed from the point $m$ to the point $n$ since after the solution has been concentrated by evaporation to the point $m$, additional ammonium sulfate may be added to the concentrated solution to shift the ammonium sulfate-calcium sulfate ratio to any selected position within the curve, as to the position designated by point $m'$. After such addition has been made, the solution may be cooled so as to crystallize beryllium sulfate from it. When the crystallization has been completed, the concentrations of ammonium sulfate and calcium sulfate will be designated by the point $n'$. It will therefore be seen that this treatment has avoided the penetration of the insoluble field $hj$, and hence has avoided the necessity of relying upon the supersaturation effect to hold the calcium sulfate in solution.

From what has just been said, it should not be thought that the supersaturation effect should be avoided wherever possible. On the contrary, the effect adds materially to the utility of the invention, since by virtue of the supersaturation effect it is possible to treat solutions which could not be treated successfully otherwise, and furthermore, all treatments are rendered less critical and therefore are more easily and cheaply controlled. For example, if one determined in the manner described above that a given amount of calcium sulfate would require a certain initial concentration of ammonium sulfate per liter under equilibrium conditions, he would be able actually to utilize ammonium sulfate concentrations which are either somewhat under the determined value or somewhat over it. Stated in another manner, the supersaturating effect permits a given concentration of ammonium sulfate to care for not only corresponding equilibrium amounts of calcium sulfate but actually to care for somewhat greater amounts. In view of this condition it will be appreciated that the supersaturating effect is helpful in several ways. It avoids the necessity for adhering exactly to equilibrium conditions, and it permits greater amounts of calcium sulfate to be retained in solution than could be retained if strict equilibrium conditions prevailed. The supersaturating effect is especially useful in solutions which contain approximately the maximum amount of calcium sulfate allowable under equilibrium conditions. For example, if it were found that after the solution had been concentrated and cooled to room temperature to crystallize beryllium sulfate therefrom, the solution would contain around 3.3 grams of calcium sulfate per liter, one would be inclined to believe that the invention could not be used to hold this latter amount of calcium sulfate in solution during the last stages of the crystallization step. In practicing the invention, however, I have found that if the peak concentration of ammonium sulfate of about 400 grams per liter is provided, the above amount of calcium sulfate may be held in solution. Under such conditions, however, the calcium sulfate is not retained in solution permanently, but only for a limited period of time; that is, the solution ultimately breaks down and some of its calcium sulfate content crystallizes out. It will be understood from what has been said previously, that the breakdown is the result of the unstable nature of the supersaturated solution and that the period of time required to induce the breakdown depends largely upon the instability or degree of supersaturation. In practicing the invention, however, I have found that the breakdown may be delayed for from one to eight hours after crystallization of beryllium sulfate has been commenced. It will be appreciated that if the solution breaks down within one hour, the supersaturating effect is usually of little value. If, however, the breakdown is delayed for a period of, say, three or four hours, then the entire crystallization of beryllium sulfate may be completed, and the calcium-free crystals of beryllium sulfate may be removed from contact with the solution, before the breakdown occurs. Under such conditions, the supersaturating effect is beneficial since it permits the invention to be employed in treating solutions which could not be treated successfully under equilibrium conditions. The supersaturation effect, therefore, is of considerable practical value.

The foregoing discussion has had to do with solutions saturated in beryllium sulfate and having not to exceed about 1.7 grams per liter of calcium sulfate in solution at room temperature. It is observed, however, that the invention is applicable to the treatment of saturated beryllium sulfate solutions containing substantially more than 1.7 grams per liter of calcium sulfate maintained in solution by the presence of a sufficient concentration of ammonium sulfate. Such solutions would not ordinarily be encountered in applying the present invention to procedures such as those of the Sawyer and Kjellgren patent which have been discussed above but they may otherwise be encountered and, as indicated, may be treated in accordance with the present invention to produce substantially calcium-free beryllium sulfate. For example, if a solution saturated in beryllium sulfate at room temperature contained in solution 325 grams per liter of ammonium sulfate and contained 2.5 grams of calcium sulfate, it is apparent from the drawing that such solution could be treated in accordance with the present invention to produce calcium-free beryllium sulfate by evaporation and cooling. By reference to the drawing it will be observed that the stated concentrations of ammonium sulfate and calcium sulfate are in a ratio somewhat greater than 125 to 1 and that the ammonium sulfate would serve to hold the calcium sulfate in solution so that, by concentrating the solution, beryllium sulfate would be crystallized for separation free of calcium contamination.

In the practice of the present invention when solutions of beryllium sulfate contain calcium sulfate in a solid state as well as in solution, it ordinarily will be desirable to remove at least the major part of the solid calcium sulfate by filtration. However, it will be clear from the preceding discussion that if for any reason it is undesirable or inconvenient to filter the beryllium sulfate solution the solid calcium sulfate can be solubilized prior to or during concentration of the solution if a sufficient amount of ammonium sulfate is added to the solution to make the ratio of ammonium sulfate to calcium sulfate not less than 125 to 1.

Now that various applications of the invention have been described, it will be understood to be subject to certain limitations as to ammonium sulfate and calcium sulfate concentrations and ratios. For example, it will be understood that the invention may be applied to a solution which contains up to about 3 grams per liter. While it was pointed out previously that as much as 3.3 grams of calcium sulfate per liter could be retained in solution, it will be understood that this concentration was measured in the cold solution after the crystallization had been completed. On the contrary, the limit of 3 grams per liter just mentioned is the limit as measured in the leaching solution after it has been concentrated to the point where it is saturated in beryllium sulfate and is ready to be treated to crystallize beryllium sulfate therefrom. Accordingly, some additional crystallization can be effected beyond this 3-gram limit before the supersaturation value of 3.3 grams per liter is reached.

As shown by the curve, an ammonium sulfate-calcium sulfate ratio of 125 to 1 is about the lowest practical limit for such ratio, while an upper limit of about 800 to 1 is established by the limiting value of ammonium sulfate. Thus as noted above, when the calcium sulfate concentration is about one-half gram per liter, practical difficulties are encountered if the ammonium sulfate concentration is increased to much over 400 grams per liter as measured in the concentrated solution prior to crystallization. For general uses, ratios between about 175 and 400 to 1 are preferred, while for treating a solution in accordance with the first procedure described herein, ratios between 200 and 250 to 1 are preferred. It will also be understood that the invention does not contemplate ammonium sulfate concentrations below about 80 grams per liter.

Thus, in the working of the process the amount of free ammonium sulfate used will range from about 80 grams per liter upward with ratios of ammonium sulfate to calcium sulfate of 125 to 1 or higher. As is shown by the drawing, a ratio of ammonium sulfate to calcium sulfate of about 175 to 1 or higher will maintain the calcium content in saturated solution while, as has been explained, ratios ranging from 175 to 1 down to 125 to 1 will maintain the calcium content in at least supersaturated solution permitting crystallization and separation of the beryllium sulfate substantially free of contamination with calcium.

The invention has been explained through examples and illustrations which have dealt largely with the essential features of the invention. It should be remembered, however, that numerous minor variations based on the variations of solubility shown in the drawing may be made by one skilled in the art in extending the application and utility of the invention. Moreover, various minor factors introduce appreciable variations. For example, the solubility of calcium sulfate in a beryllium sulfate solution containing any given concentration of free ammonium sulfate within the ranges set forth above, will, in general, be increased as the beryllium sulfate concentration is decreased. Furthermore, the effect of temperature on the solubility of calcium sulfate in solutions of the character involved here should be considered, since, in general, more calcium sulfate may be dissolved in a boiling sulfate solution than in one at, say 20° C. This increased solubility is indicated in the figure by the dash line A—A'. Where refrigeration is employed to effect crystallization at temperatures below ambient room temperatures, due consideration should be given to the reduced solubility induced by the use of such lower temperatures. It is noted in this connection that the term "crystallization," unless expressly limited, is used herein in a broad sense including any of the known procedures or treatments for effecting crystallization. It should also be recognized that the solubility of calcium sulfate is affected by various ions which may be allowed to be present in the solution by reason of the fact that they do not interfere with the formation of nearly pure crystals of beryllium sulfate. Since the maximum permissible concentrations depend on the material itself, and since the actual amounts of such ions may vary considerably depending on the type of ore which has been treated, and on the character of the previous steps in the process, their concentrations cannot be expressed readily. Nevertheless, the concentrations which may normally be present or encountered are capable of introducing sizable variations in the solubility of calcium sulfate. Those skilled in the art will appreciate that these various factors as just discussed permit numerous departures to be made from the procedure and examples described above without defeating the objects of the invention and without departing from its principles.

It will be understood that the invention is not limited to the particular procedures and examples which have been discussed for purposes of explanation and illustration and that the invention may be practiced in a variety of ways within the bounds of the appended claim and equivalent procedures.

Having now disclosed the invention, what I claim is:

A process for producing substantially calcium-free beryllium sulfate which includes the steps of producing a solution which at room temperature is substantially saturated with beryllium sulfate and has also in solution calcium sulfate not to exceed 3 grams per liter of solution and an amount of ammonium sulfate not less than about 80 grams per liter of solution and such that the ratio of ammonium sulfate to calcium sulfate is at least approximately 125 to 1; evaporating said solution to a point where a substantial amount of beryllium sulfate is crystallized on cooling but where the resultant increase in concentration of ammonium sulfate will still maintain the calcium sulfate in at least supersaturated solution; and separating the crystals of beryllium sulfate so formed.

BENGT R. F. KJELLGREN.